(12) United States Patent
Carter et al.

(10) Patent No.: US 6,447,902 B1
(45) Date of Patent: Sep. 10, 2002

(54) DELAMINATION PREVENTION METHOD AND PRODUCT

(76) Inventors: H. Landis Carter, 100 Ticonderoga Dr., Greer, SC (US) 29650; Frank Christopher Malik, 402 Spring Meadow Rd., Simpsonville, SC (US) 29680

( * ) Notice: Subject to any disclaimer, the term of this patent is extended or adjusted under 35 U.S.C. 154(b) by 0 days.

(21) Appl. No.: 09/860,065

(22) Filed: May 17, 2001

Related U.S. Application Data

(60) Provisional application No. 60/205,170, filed on May 17, 2000.

(51) Int. Cl.[7] ................................................. B32B 9/00
(52) U.S. Cl. .................. 428/367; 428/377; 428/331; 428/324; 156/196; 156/212
(58) Field of Search .................. 428/297, 367, 428/377, 373, 331, 324, 325; 156/196, 182, 212

(56) References Cited

U.S. PATENT DOCUMENTS

| | | | | |
|---|---|---|---|---|
| 3,565,127 A | * | 2/1971 | Nicely | |
| 3,599,679 A | * | 8/1971 | Carter | |
| 4,055,862 A | | 11/1977 | Farling | 3/1.91 |
| 4,559,862 A | | 12/1985 | Case et al. | 87/1 |
| 5,413,649 A | | 5/1995 | Dunand et al. | 148/564 |
| 5,543,186 A | | 8/1996 | Andersen et al. | 428/34.4 |

* cited by examiner

*Primary Examiner*—Merrick Dixon
(74) *Attorney, Agent, or Firm*—McNair Law Firm, P.A.

(57) ABSTRACT

A joint and method for forming a joint between two spaced apart materials having dissimilar coefficients of thermal expansion wherein the space is filled with a blended composite of twisted fibrils of the two materials, preferably quartz and carbon, and an adhesive, preferably an epoxy based adhesive.

6 Claims, 2 Drawing Sheets

DELAMINATION PREVENTION METHOD AND PRODUCT

This application claims benefit of Provisional application Ser. No. 60/205,170, filed May 17, 2000.

FIELD OF THE INVENTION

This invention relates to preventing delamination between joined materials which have different thermal coefficients of expansion. Specifically, the invention relates to providing a fiber based interface reinforcement between two dissimilar materials that are to be joined. Even more specifically, this invention relates to unique fibers and their use in joining dissimilar materials.

BACKGROUND OF THE INVENTION

A long standing problem that is present in many fields where a structure is constructed or components are assembled from materials having different thermal coefficients of expansion is how to compensate for the difference. Such a structure may be a roof, a pipeline, concrete highway or bridge, nose cone for a rocket or an assembly of parts for a space craft.

When materials having different thermal coefficients of expansion are joined without provision for the expansion, the result can be wrinkling, buckling, delamination, rupture and even collapse. Typically, expansion joints are provided with cushioning or stress and force absorbing elastomeric fillers. Joints have to be especially designed to compensate for expansion and contraction as ambient temperatures vary constantly. Accordingly, it is a primary object of the present invention to provide a novel method and product to deal with and compensate for the difference in thermal coefficients of expansion between dissimilar materials that are joined.

In space craft today, two differing materials which may be joined are carbon panels or parts to quartz panels or parts. These parts may be planar in configuration or they may have complex curves and bends. The different coefficients of thermal expansion make it difficult to achieve a secure joining of the materials. Accordingly, it is another object of the present invention to provide a satisfactory method and means for joining quartz components with carbon components.

Applicant's unique and surprising solution to the foregoing mentioned problems are described in the Summary of Invention and Detailed Description which follow.

SUMMARY OF THE INVENTION

In one aspect the invention is a method of joining a first and second dissimilar materials by blending the first and second materials to form a composite which has a coefficients of expansion intermediate of the two materials. The composite material can then be adhesively joined to a respective surface of the first and second dissimilar material at and in the interface to form a sandwich construction:

First material/Composite/Second material

High strength adhesives such as those based on epoxy resins are well known to those skilled in the art are used to adhere to composite to the first and second interface surfaces.

The foregoing aspect of the invention is adaptable to materials which blend compatibly such as polymeric and metallic materials that are mutually soluble in each other and/or and can be melt blended to form true mixtures or compounds and which include blends, suspensions, and alloys. However, not all materials can be readily blended by melt or solution blending. Accordingly, another aspect of the invention is described below.

In a second aspect of our invention, fibrils or fibers of the dissimilar materials are blended in strands or bundles which can be twisted and spun into yarn and then woven or braided into a fabric or composite yarn. This blended yarn may be the sandwiched portion between joined interfaces and surrounded with an adhesive which joins the material surfaces in the interface. The yarn or fabric within the adhesive acts as a reinforcement much the same way that concrete is reinforced by re-bars.

In still another aspect, carbon fibers may be twisted with quartz fibers to form a strand wherein the amount of carbon and quartz in the twisted yarn can be varied to provide a compatible composite coefficient of thermal expansion depending on the size and configuration of the quartz and carbon components being joined. The composite yarn may be woven into a fabric to reinforce the joint or braided into a mini-cable to fit within a joint. The selection of the configuration of the composite structure depends on the geometry of the joint being joined.

The invention will be better understood and appreciated by the drawings and detailed description which follow.

DESCRIPTION OF THE DRAWINGS

The invention will be more readily understood from a reading of the following description and by reference to the accompanying drawings forming a part thereof, wherein an example of the invention is shown and wherein.

DESCRIPTION OF A PREFERRED EMBODIMENT

Figure 1:
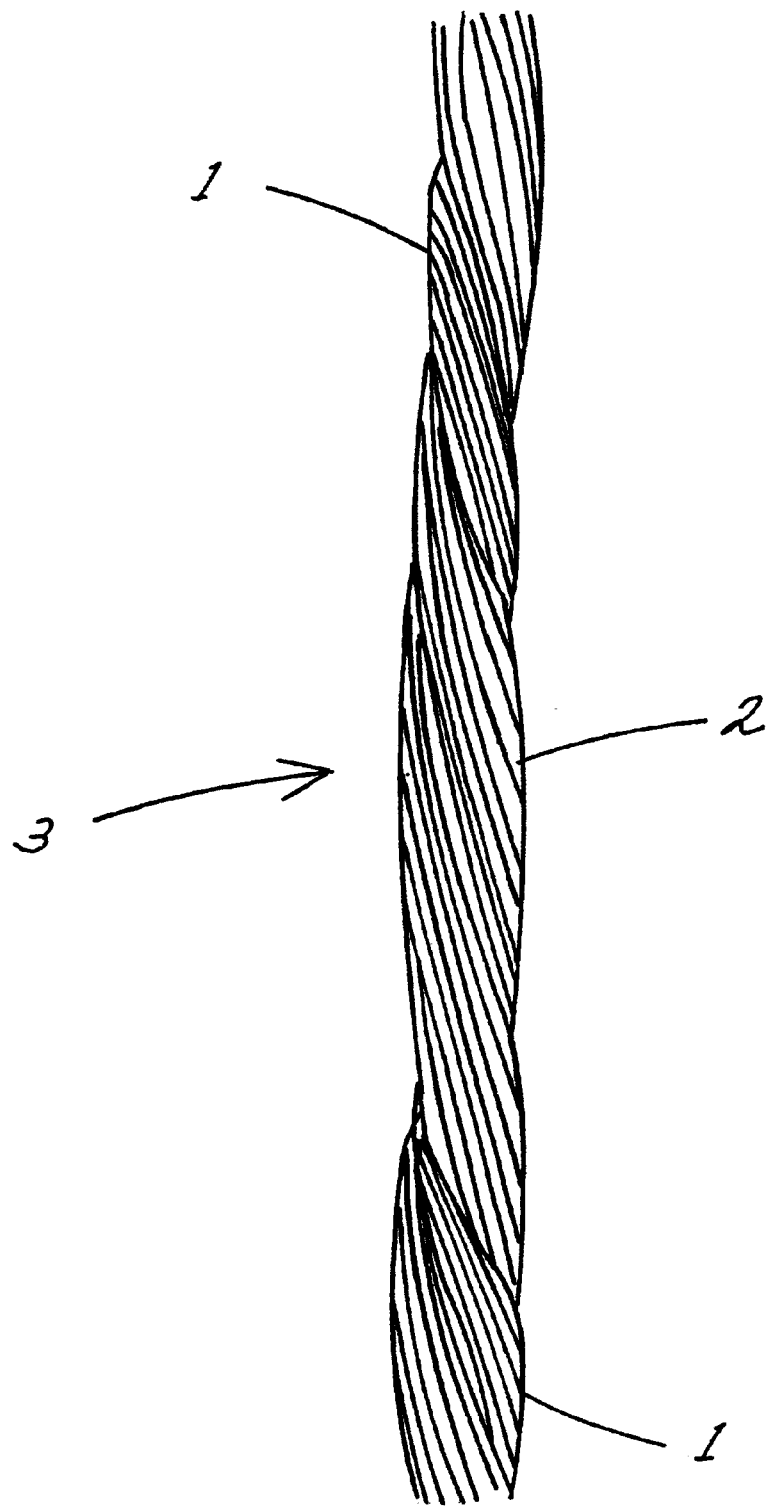
FIG. 1 is a schematic representation of a twisted yarn which blends fibers of two dissimilar materials, and, FIG. 2 is a schematic representation of a joint which employs the present invention wherein the joint is filled with a composite fiber and adhesive.
Figure 2:
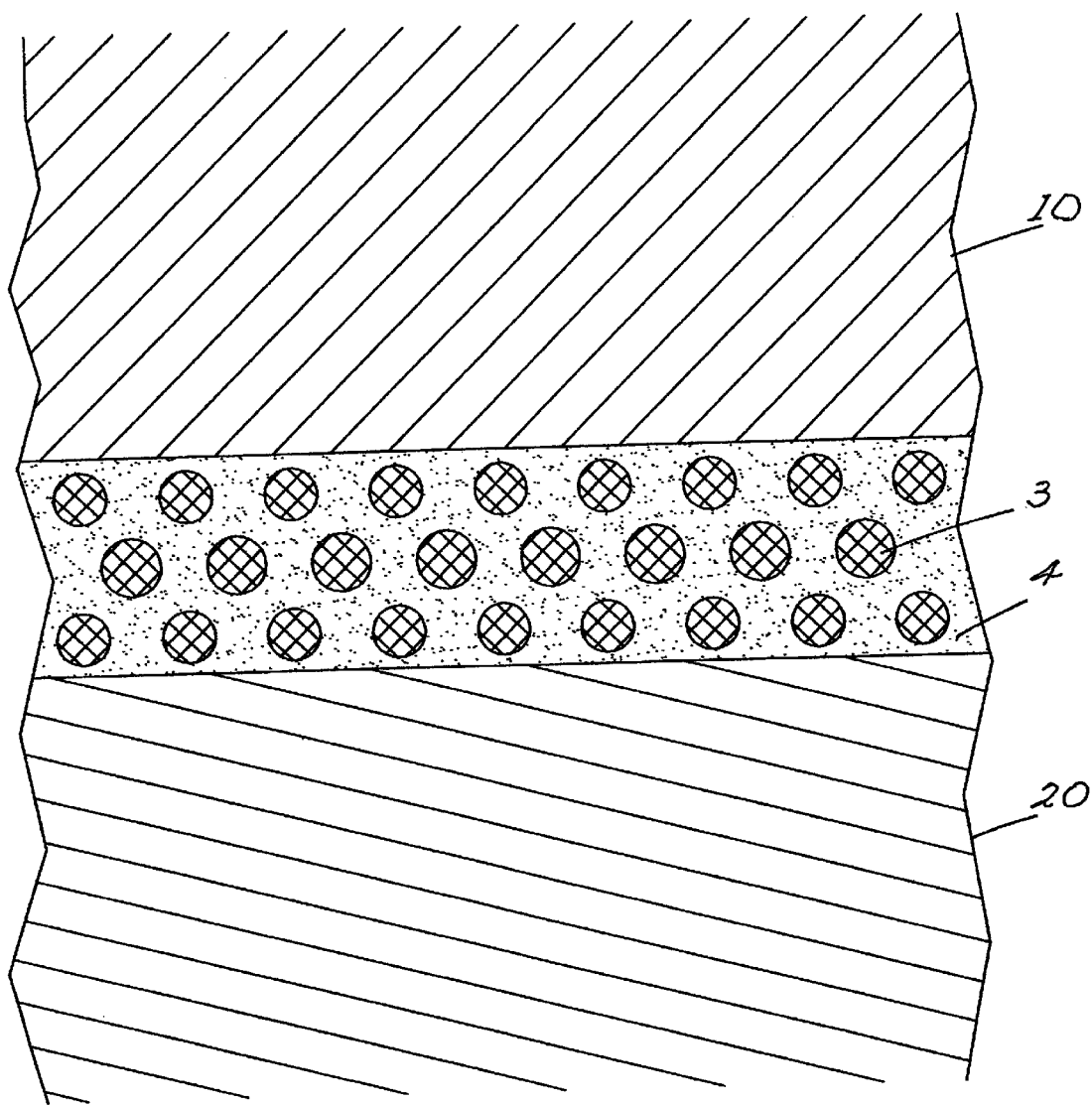

Turning now to FIGS. 1 and 2, one preferred embodiment of the invention will be described. FIG. 1 shows a yarn strand 3 which comprises quartz fiber 1 twisted around carbon fibers 2. These yarns have been twisted by an RTS Twister which is a twisting apparatus that is well known to those skilled in the art. In the general case, the weights of carbon and quartz per unit length will be relatively equal. The quartz fiber preferably is direct sized with a coupling agent which is preferably a saline coupling agent that is well known in the art. The fiber linear density may range from 100–5000 denier. The quartz fibers can be obtained from QPC, Inc.

The carbon fibers are preferably those sold as Amoco T-300 and the fibers come in weights of 3,6, and 12K meaning 3000, 6000, and 12,000 filaments per strand.

The quartz and carbon filaments are wound or twisted by the RTS Twister and the results have the appearance schematically as shown in FIG. 1 where quartz fiber and carbon fiber 2 are mutually twisted together.

Turning now to FIG. 2, a representative joint is shown schematically. Component 10 comprises quartz and component 20 comprises carbon. Then components may be planar panels or other components of more complex geometry. The blended yarn 3 is a representation of a material woven from the yarn and the ends can be seen in cross-section. In a small joint a single braided strand might be sufficient. Filling the joint is epoxy based adhesive which may be an epoxy cyanide or other organic adhesive which is well known. The composite reinforced joint provides a secure joining of the carbon and quartz materials which resist the stress and forces of thermal expansion and provide security against joint failure that cannot be achieved with an adhesive alone.

While we have shown and described particular embodiments of our invention, modifications and variations thereof will occur to those skilled in the art and who subsequently observe the invention or read the specification. We wish it to be understood therefore that the claims below are intended to cover such modifications and variations which are in the scope and spirit of our invention.

What we claim is new and desire to secure by Letters Patent of the United States is claimed below:

1. As an article of manufacture, a twisted yarn comprising carbon filaments and quartz filaments, said quartz filament being direct sized and twisted around the carbon filaments.

2. The twisted yarn article of claim 1 wherein the weight of the quartz and carbon fibers per unit length of yarn is substantially the same.

3. A reinforced joint securing spaced apart components of first and second materials together, said materials having differing coefficients of thermal expansion comprising:
   a) a composite comprising yarns of twisted fibrils, said fibrils comprising the same materials as said first and said second materials;
   b) an adhesive that will adhere to the surfaces of the first and second materials, said composite being positioned between said components, the space between said components being filled with said adhesive and said composite.

4. The joint of claim 3 wherein like first and second materials are carbon and quartz respectively and the adhesive is epoxy based.

5. A method of reinforcing an adhesively secured joint which joins first and second materials that have differing coefficients of thermal expansion comprising the steps of:
   a) providing a first component comprising a material comprising quartz, and second component comprising a material comprising carbon, said components having respective surfaces which are to be joined to each other;
   b) providing a composite which is a blend of quartz material with carbon material;
   c) providing an epoxy adhesive that will adhere to the respective surfaces of the quartz and carbon components; and,
   d) positioning the composite and adhesive between the surfaces to be joined and joining said surfaces to form a joint with improved resistance to thermal expansion and contraction.

6. The method of claim 1 wherein the composite comprises non-collimated carbon and quartz fiber.

* * * * *